March 12, 1935.  R. R. TOE LAER  1,994,236
DRAIN FOR BOATS AND THE LIKE
Filed April 16, 1932

INVENTOR
Robert R. Toe Laer
BY
Gifford, Scull & Burgess
ATTORNEYS.

Patented Mar. 12, 1935

1,994,236

UNITED STATES PATENT OFFICE 1,994,236

DRAIN FOR BOATS AND THE LIKE

Robert R. Toe Laer, Newark, N. J., assignor to The National Lock Washer Company, Newark, N. J., a corporation of New Jersey Application April 16, 1932, Serial No. 605,579

6 Claims. (Cl. 114—197)

This invention relates to a novel and improved drain fitting which can be used with boats having hulls of varying thicknesses. The novel features of the invention will be best understood from the following description and the annexed drawing, in which I have shown a selected embodiment of the invention, and in which.

Figure 1:
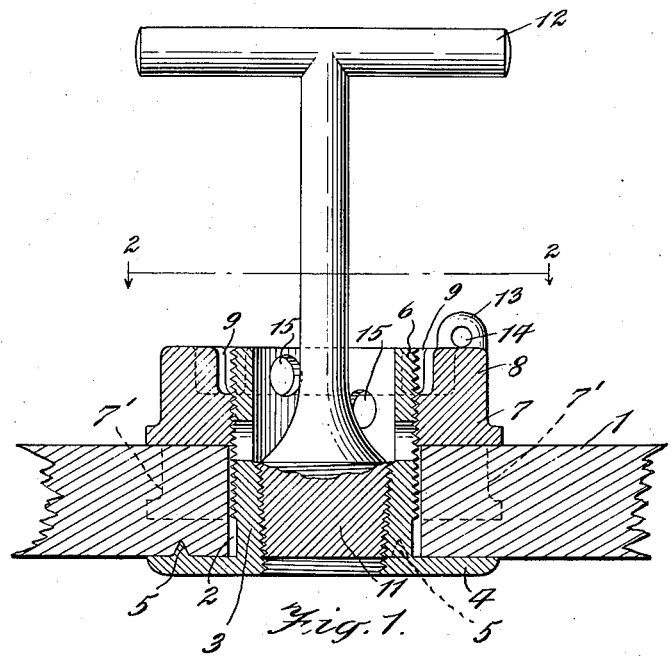
Fig. 1 is a vertical sectional view through a boat hull bottom, showing one form of the invention applied thereto.
Figure 2:
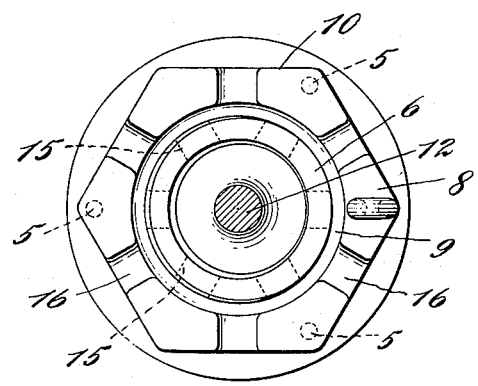
Fig. 2 is a view on the line 2—2 of Fig. 1.
Figure 3:
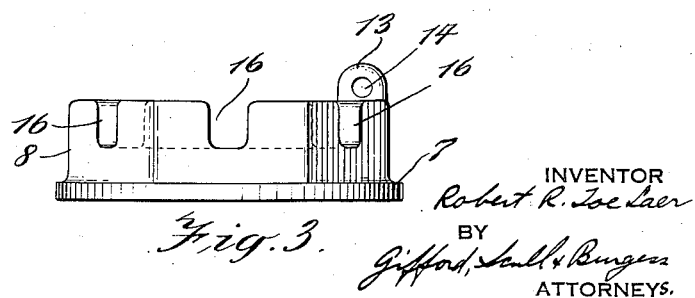
Fig. 3 is a vertical view of a nut detached from the fitting.

The numeral 1 designates the bottom of a boat hull having therein a hole 2 for drainage. This hole has disposed therein a fitting in the form of a tube 3 having a flange 4 extending outwardly from the tube and engaging the under side of the hull bottom. This flange may have one or more pointed projections 5 embedded within the wood of which the bottom is presumed to be made in this instance, although, of course, the invention may be used where the boat is made of other material.

The tube has a portion 6 extending within the hull above the bottom, and is provided on its exterior with screw threads as indicated. Threaded on the tube is a nut 7 having a lower portion provided with threads to engage the threads on the tube and having an upper wall 8 above the threads on the nut, this wall being spaced from the tube as plainly shown at 9.

By the above arrangement, the fitting may be put in place in the hole 2 by inserting the tube 3 therein and then threading the nut on the tube and tightening it as by engagement of a wrench with the wrench faces 10 thereon. The nut and the flange 4 will thus engage the upper and under sides of the bottom and serve to clamp the tube in place. Ordinarily, the hole 2 may have a suitable packing or the like in order to provide a tighter fit between the wall of the hole 2 and the adjacent wall of the tube, if this is found necessary, although, for the sake of clearness, any such expedient which may be employed is not attempted to be illustrated.

A suitable plug 11 may be inserted within the tube, and in this form it is shown as being threaded in place therein and provided with a handle 12 by means of which it may be inserted and removed. The nut 7 may have a lug 13 thereon provided with an aperture 14 for a chain or other fastening device not shown, by means of which the handle may be secured to the nut if desired.

The above arrangement is one which may easily be used for varying thicknesses of hull bottoms, the dotted line position 7' indicating the lowermost position of the nut 7 and giving some idea of the range of thickness which it is possible to obtain. Of course, the threaded portion of the nut may move upwardly to the top of the portion 6 of the tube and thus it will be seen that a very wide range in thickness of bottom may be accommodated by the one fitting.

The portion 6 of the tube is provided with one or more holes 15, here shown as spaced apart along the length of the tube. In the form shown, the top hole 15 will register with the space 9 between the wall of the nut and the tube so that any water collecting in that space may find its way to the inside of the tube, and then when the plug is removed this water may drain out through the bottom, it being understood, of course, that the plug is removed when the boat is beached or otherwise lifted out of the water for that purpose. By spacing the holes lengthwise of the tube, the space 9 within the nut will always register with one or more of these holes, no matter what the thickness of the hull bottom may be, within the limits for which the fitting is designed.

The wall 8 is preferably provided with laterally extending openings 16 communicating with the space 9 so that water gathered in the boat may drain freely through these openings into the interior of the tube when it is desired to drain the boat.

It is believed that the operation of this invention will be apparent from the above description, and no detailed repetition of the operation thereof will be attempted.

While the invention has been embodied in a certain form, I am aware that various changes in details may be made without departing from the scope of the invention, and therefore I do not intend to limit myself except by the appended claims.

I claim:

1. A drain fitting for a boat hull having a hole in the bottom thereof, said fitting comprising a tube disposed within said hole and having a portion extending within the hull above said bottom and another portion engaging the under side of said bottom, said portion of the tube above the hull bottom having a hole extending through the wall thereof, a plug within said fitting and disposed below said hole in the tube, and a nut engaging the upper side of the bottom and having a portion thereof in threaded engagement with the tube above said bottom, said nut having an upper portion unthreaded and spaced from the tube to provide a space communicating with said hole.

2. A drain fitting for a boat hull having a hole in the bottom thereof, said fitting comprising a tube disposed within said hole and having a portion extending within the hull above said bottom and another portion engaging the under side of said bottom, a nut threaded on said tube above said bottom and engaging the upper side thereof, said portion of the tube above the hull bottom having a plurality of holes extending through the wall thereof and spaced longitudinally of the tube, and a plug within said fitting and disposed below the lowest one of said plurality of holes.

3. A drain fitting for a boat hull having a hole in the bottom thereof, said fitting comprising a tube disposed within said hole and having a portion extending within the hull above said bottom and another portion engaging the under side of said bottom, a nut threaded on said tube above said bottom and engaging the upper side thereof, said portion of the tube above the hull bottom having a hole extending through the wall thereof, a plug within said fitting and disposed below said last-named hole, said nut having a threaded portion engaging the tube, and a wall above said threaded portion spaced from the tube.

4. A drain fitting for a boat hull having a hole in the bottom thereof, said fitting comprising a tube disposed within said hole and having a portion extending within the hull above said bottom and another portion engaging the under side of said bottom, a nut threaded on said tube above said bottom and engaging the upper side thereof, said portion of the tube above the hull bottom having a hole extending through the wall thereof, a plug within said fitting and disposed below said last-named hole, said nut having a threaded portion engaging the tube, and a wall above said threaded portion spaced from the tube and having an opening therethrough.

5. A drain fitting for a boat hull having a hole in the bottom thereof, said fitting comprising a tube disposed within said hole and having a portion extending within the hull above said bottom and another portion engaging the under side of said bottom, a nut threaded on said tube above said bottom and engaging the upper side thereof, said portion of the tube above the hull bottom having a plurality of holes extending through the wall thereof and spaced longitudinally of the tube, a plug within said fitting and disposed below the lowest one of said plurality of holes, said nut having a threaded portion engaging the tube, and a wall above said threaded portion spaced from the tube.

6. A drain fitting for a boat hull having a hole in the bottom thereof, said fitting comprising a tube disposed within said hole and having a portion extending within the hull above said bottom and another portion engaging the under side of said bottom, a nut threaded on said tube above said bottom and engaging the upper side thereof, said portion of the tube above the hull bottom having a plurality of holes extending through the wall thereof and spaced longitudinally of the tube, a plug within said fitting and disposed below the lowest one of said plurality of holes, said nut having a threaded portion engaging the tube, and a wall above said threaded portion spaced from the tube and having an opening therethrough.

ROBERT R. TOE LAER.